(12) United States Patent
Ikeda et al.

(10) Patent No.: US 6,711,167 B1
(45) Date of Patent: *Mar. 23, 2004

(54) ATM COMMUNICATION APPARATUS CONTROLLING METHOD, ATM COMMUNICATION APPARATUS AND RECORDING MEDIUM THEREFOR

(75) Inventors: Chinatsu Ikeda, Tokyo (JP); Yasuharu Tomimitsu, Tokyo (JP)

(73) Assignee: NEC Electronics Corporation, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/246,732

(22) Filed: Feb. 9, 1999

(51) Int. Cl.[7] ........................... H04L 12/28; H04L 12/56
(52) U.S. Cl. .................. 370/395.1; 370/397; 370/399; 370/395.5; 370/395.52; 370/395.6
(58) Field of Search ................................ 370/389, 392, 370/395.1, 396, 397, 398, 399, 395.5, 395.52, 395.6, 422, 423, 466, 469, 471, 474, 905, 912

(56) References Cited

U.S. PATENT DOCUMENTS

| | | | | |
|---|---|---|---|---|
| 5,715,250 A | * | 2/1998 | Watanabe | 370/395 |
| 5,959,994 A | * | 9/1999 | Boggs et al. | 370/399 |
| 6,026,443 A | * | 2/2000 | Oskouy et al. | 709/230 |
| 6,088,355 A | * | 7/2000 | Mills et al. | 370/392 |
| 6,147,999 A | * | 11/2000 | Honda et al. | 370/396 |
| 6,222,839 B1 | * | 4/2001 | Nakazaki et al. | 370/352 |
| 6,243,382 B1 | * | 6/2001 | O'Neill et al. | 370/395 |
| 6,330,239 B1 | * | 12/2001 | Suzuki | 370/395 |

FOREIGN PATENT DOCUMENTS

| | | |
|---|---|---|
| EP | 0 531 599 A1 | 3/1993 |
| JP | 7-321794 | 12/1995 |
| JP | 9-98189 | 4/1997 |
| WO | WO 96/08896 | 3/1996 |

OTHER PUBLICATIONS

European Search Report dated Dec. 20, 2002.
R.F. Hobson and P.S. Wong, "A Concurrent Architecture for 622Mb/s ATM Segmentation and Reassembly", IEEE WESCANEX '95 Proceedings, 1995, pp. 226–231.
Tomimitsu, et al., "An ATM Chip Set for High Performance Computer Interfaces, Affording over 100MBPS Sustained Throughput", IEEE 1995 Custom Integrated Circuits Conference, May 1, 1995, pp. 439–442.
Chinese Office Action dated Jul. 18, 2003 with English translation.

* cited by examiner

Primary Examiner—Hassan Kizou
Assistant Examiner—Joe Logsdon
(74) Attorney, Agent, or Firm—McGinn & Gibb, PLLC

(57) ABSTRACT

There is disclosed an ATM communication apparatus including an SAR module for executing the processing of a low level layer in an ATM communication network, and a processing unit for executing the processing of a high level layer in the ATM communication network, for the purpose of realizing the function of converting an ATM cell which is a unit of information transmission in the ATM communication network, into an IP packet adapted to a communication protocol of a computer network, and the function of converting the IP packet to ATM cells. Segmentation and reassembly of the IP packet is executed in the SAR module. Thus, congestion of data between the SAR module and the processing unit can be reduced, so that the throughput from the input of the ATM cells to the output of the IP packet and from the input of the IP packet to the output of the ATM cells can be elevated.

20 Claims, 8 Drawing Sheets

Fig. 2

| VCI/VPI | VC NO. | DESTINATION |
|---|---|---|
| 1 | 1 | CPU |
| 2 | 2 | FIRST ETHERNET I/F |
| 3 | 3 | SECOND ETHERNET I/F |
| 4 | 4 | ATM25 I/F |
| 5 | 5 | CPU |

| VCI/VPI | VC NO. |
|---------|--------|
| 1 | 1 |
| 2 | 2 |
| 3 | 3 |
| 4 | 4 |
| 5 | 5 |

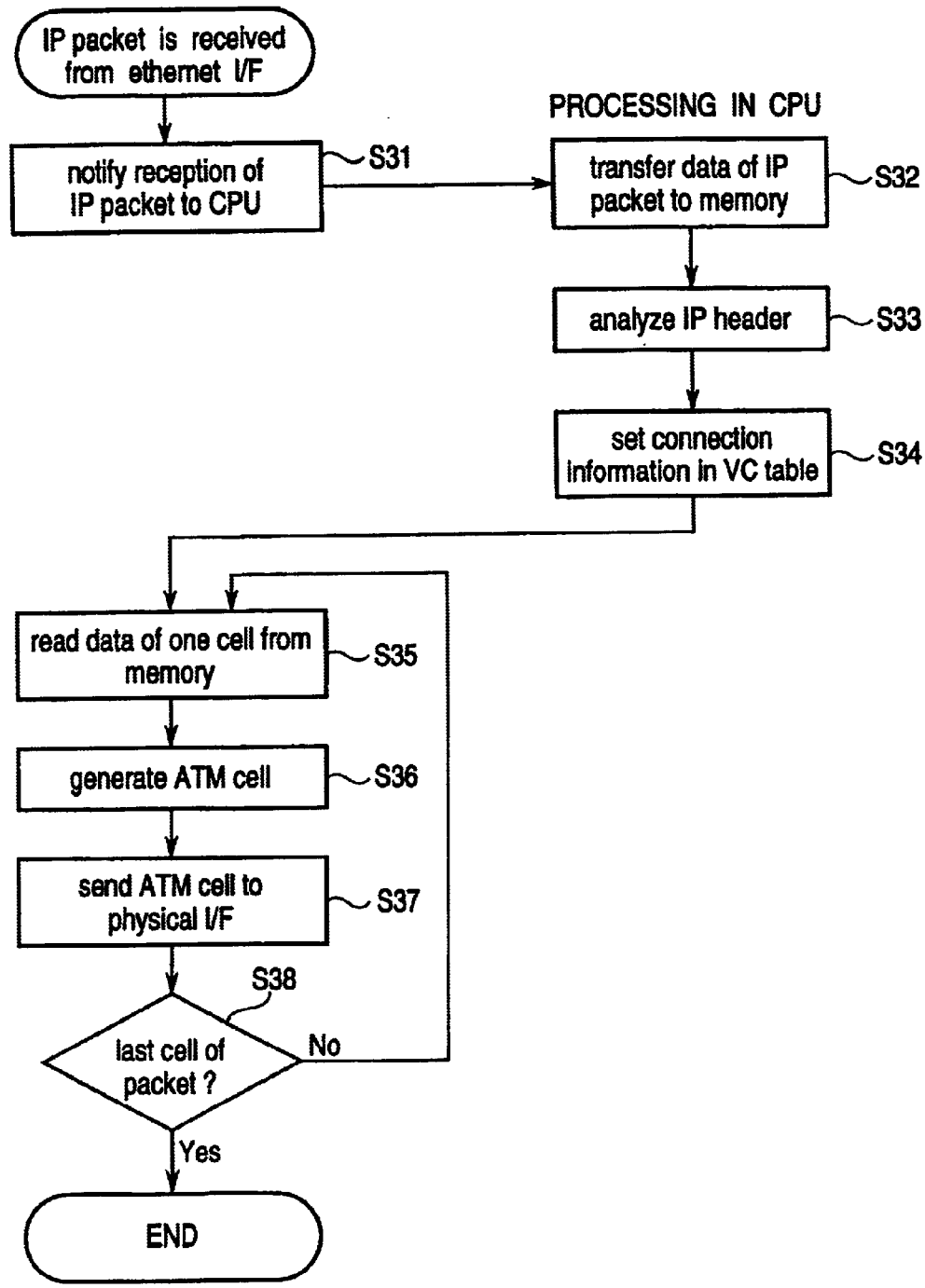

ATM COMMUNICATION APPARATUS CONTROLLING METHOD, ATM COMMUNICATION APPARATUS AND RECORDING MEDIUM THEREFOR

BACKGROUND OF THE INVENTION

1. Field of the Invention

The present invention relates to an ATM (asynchronous transfer mode) communication apparatus realizing the function of converting ATM cells into an IP (internet protocol) packet adapted to a communication protocol of a computer network such as LAN (local area network), and the function of converting the IP packet into the ATM cells.

2. Description of Related Art

In an ATM communication network, a communication protocol for transmitting data is constituted of a plurality of layers, each of which has an inherent function. One layer is realized by utilizing the function of a layer inferior to the first named layer by one layer.

Of the plurality of layers, a low level layer which is the most remote layer from a user's side, includes a physical layer, an ATM layer and ATM adaptation layer.

The physical layer is a layer for providing a resource for transferring an ATM cell which is a unit of information transmission, and specifically, executes generation of a signal format suitable to a transmission medium, receiving of a signal, an encoding, or generation and elimination of a transmission frame. Furthermore, the physical layer checks whether or not the information included in the cell is effective, and transfers the cell carrying the effective information (effective cell) to the ATM layer.

The ATM layer is a layer superior to the physical layer by one layer, and executes a multiplexing and a separation of cells and generation and extraction of an ATM header indicating the destination of the ATM cell.

The ATM adaptation layer is positioned between the ATM layer and a layer superior to the ATM layer, and has the function of segmentation and reassembly of the ATM cell and of verifying the correctness of the ATM cell to inform the result of the verification to the superior layer.

The ATM cell includes in an ATM header a label for identifying a virtual channel (VC) or a virtual path (VP) to which the ATM cell itself belongs. This label is constituted of a virtual channel identifier (VCI) or a virtual path identifier (VPI), and an individual VC is unambiguously identified by a combination of VPI and VCI. In the following, the number given to a respective VC is called a VC number (VC No.)

On the other hand, it has been known to use a router as a technology for connecting an internet to a small scaled computer network such as SOHO (small office home office). Here, if the internet is the ATM communication network and the computer network is an ethernet, the router includes, in addition to the above mentioned functions of the physical layer, the ATM layer and the ATM adaptation layer, the function of converting ATM cells sent from the ATM communication network, into an IP (internet protocol) packet adapted to a communication protocol of the computer network, and the function of converting the IP packet sent from the computer network, into the ATM cells.

In the following, the ATM communication apparatus realizing the function of converting the ATM cells into the IP packet and the IP packet into the ATM cells, will be described with reference to the router as one example.

FIG. 5 is a block diagram showing the construction of the router which is one example of the prior art ATM communication apparatus. FIG. 6 is a table illustrating one example of the construction of the lookup table provided in a sending/receiving controller shown in FIG. 5. FIG. 7 is a diagram illustrating the relation between the IP packet and the ATM cells.

Referring to FIG. 5, the prior art router includes a SAR (segmentation and reassembly) module 11 for executing the processing of a low level layer, a CPU 12 for executing segmentation and reassembly of the IP packet and the processing of a high level layer, a memory 13 for temporarily storing data used in the processing of the CPU 12, a first ethernet interface $14_1$ and a second ethernet interface $14_2$ which are an interface circuit for sending data to a network (ethernet) and receiving data from the network (ethernet), an ATM25 interface $14_3$ which is an interface circuit for sending data to a network of the ATM25 specification and receiving data from the network of the ATM25 specification, and a recording medium 15 storing a processing program executed in the CPU 12.

Here, the SAR module 11, the CPU 12, the memory 13, the first ethernet interface $14_1$, the second ethernet interface $14_2$, the ATM25 interface $14_3$, the recording medium 15 are connected to an I/O bus 16 which is a data transfer medium. Incidentally, the first ethernet interface $14_1$, the second ethernet interface $14_2$, the ATM25 interface $14_3$ are provided dependently upon the network to which the router is connected, and therefore, it is not limited to this construction.

The SAR module 11 includes a physical interface 17 which is an interface circuit for sending data to the ATM communication network and receiving data from the ATM communication network, a sending/receiving controller 18 for executing the proceedings of the ATM layer and the ATM adaptation layer, and a bridge 19 which is an interface circuit for sending data to the CPU and receiving data from the CPU.

The sending/receiving controller 18 includes a lookup table for recording the relation between VCI/VPI and the VC number used in the router (see FIG. 6) and a VC table recording the VC number, the address of a memory region for storing the data of the received ATM cell and IP packet, and VC associated data, such as the number of ATM cells and the packet length.

Incidentally, as shown in FIG. 7, the ATM cell which becomes a heading cell of the IP packet (simply called a "heading cell" hereinafter), includes an IP header composed of the destination information of the IP packet itself, control information, etc. On the other hand, the ATM cell which becomes a last cell of the IP packet (simply called a "last cell" hereinafter), includes a trailer composed of the packet length information of the IP packet itself, error check information, etc.

Now, an operation of the prior art router mentioned above will be described with reference to FIG. 8 and FIG. 9. FIG. 8 is a flow chart illustrating the processing procedures of the router shown in FIG. 5 for converting the ATM cells to the IP packet, and FIG. 9 is a flow chart illustrating the processing procedures of the router shown in FIG. 5 for converting the IP packet to the ATM cells.

In the processing procedures shown in FIG. 8 for converting the ATM cells to the IP packet, if the sending/receiving controller 18 in the SAR module 11 receives the ATM cell through the physical interface 17, the sending/receiving controller 18 analyzes the content of the ATM header (step S21), and discriminates whether or not the received ATM is the heading cell of the IP packet (step S22).

If the received ATM is the heading cell of the IP packet, the sending/receiving controller 18 reserves, in the memory 13, a predetermined amount of memory region for storing the data of the ATM cell which constitutes the IP packet (step S23). If the received ATM is not the heading cell of the IP packet, the processing of the step S23 is not executed, and the processing goes into a next processing (step S24).

In the step S24, the sending/receiving controller 18 refers to the lookup table, and obtain the VC number corresponding to VCI/VPI of the received ATM cell, and further, refers to the VC table on the basis of the obtained VC number, and write the data of the received ATM into the memory region reserved in the step S23. When the received ATM is the heading cell of the IP packet, the data is written from the heading address of the reserved memory region. The address of the memory region is recorded in the VC table as the data corresponding to the VC number. After the data of the ATM cell has been written, the address of this memory region is updated to a succeeding address. On the other hand, when the received ATM is not the heading cell of the IP packet, the data of the received ATM is written from the memory region address recorded in the VC table (the updated address).

Next, the sending/receiving controller 18 analyzes the ATM header of the received ATM cell, again, and discriminates whether or not the received ATM is the last cell of the IP packet (step S25). When the received ATM cell is not the last cell of the IP packet, the processing is ended without executing succeeding steps S26 and S27.

When the received ATM is the last cell of the IP packet, the receiving processing of the last cell such as the freeing of the memory region which has been used, is executed (step S26), and then, completion of reception of the ATM cells constituting the IP packet is notified to the CPU 12 (step S27).

When the CPU 12 receives the notification of the completion of reception of the ATM cells, the CPU 12 reassembles the IP packet by using the data of the ATM cells stored in the memory 13, and analyzes the content of the IP header included in the heading cell (step S28) so as to discriminate the destination. Furthermore, the CPU 12 sends the IP packet through the internet interface corresponding to the destination, of the first internet interface $14_1$ and the second internet interface $14_2$.

In the step 28, if the result of the analysis of the content of the IP header included in the heading cell indicates that the destination of the ATM cell is "ATM25", the CPU 12 does not reassemble the IP packet, and transfers the ATM cell to the ATM25 interface $14_3$ as it is.

Next, the procedures for converting the received IP packet to the ATM cells will be described with reference to FIG. 9.

In the procedures illustrated in FIG. 9, if the sending/receiving controller 18 in the SAR module 11 receives the IP packet through the first internet interface $14_1$ or the second internet interface $14_2$, the sending/receiving controller 18 notifies reception of the IP packet to the CPU 12 (step S31).

If the CPU 12 receives the notification of reception of the IP packet, the CPU 12 reserves a predetermined amount of memory region in the memory 13, and transfers the data of the received IP packet to the reserved memory region (step S32). Furthermore, the CPU 12 analyzes the content of the IP header of the received IP packet (step S33), and sets the connection information in the VC table provided in the SAR module 11 (step S34). Here, as the connection information, the IP address indicating the destination of the IP packet, the VC number, the VCI/VPI relation to be given in an ATM cell, are recorded.

After the processing of the step S34 by the CPU is completed, the sending/receiving controller 18 reads out data of the amount corresponding to one cell, from the memory region storing the data of the IP packet (step S35), and generates one ATM cell by using the read-out data (step S36). At this time, an ATM header is given to the ATM cell, by using the VCI/VPI value obtained by referring to the VC table.

Thereafter, the sending/receiving controller 18 sends the generated ATM cell through the physical interface 17 to the ATM communication network (step S37), and discriminates whether or not the sent ATM cell is the last cell of the IP packet (step S38). If the sent ATM cell is not the last cell of the IP packet, the processing returns to the step S37, so that the processing of the steps S35–S37 is repeated. If the sent ATM cell is the last cell of the IP packet, the processing is ended.

Incidentally, when the ATM cell is received through the ATM25 interface $14_3$, the received ATM cell is transferred through the physical interface 17 to the ATM communication network as it is.

Since the SAR module provided in the prior art ATM communication apparatus mentioned above performs only the processing of the low level layer, all of the received ATM cells and IP packet are transferred to the CPU so that the IP packet is reassembled and segmented in the CPU. At this time, the segmentation and reassembly of the IP packet is executed by the CPU in accordance with a program recorded in the recording medium. However, since the CPU executes the processing of a high level layer in addition to the segmentation and reassembly of the IP packet, it is a problem that the throughput from the reception of the ATM cell to the output of the IP packet and the throughput from the reception of the IP packet to the output of the ATM cell becomes slow.

In the prior art ATM communication apparatus, furthermore, the data of all of the received ATM cells is transferred from the SAR module to the memory and after the IP packet has been reassembled, the IP packet is transferred from the CPU to the ethernet interface. Therefore, data is transferred through the I/O bus two times. In addition, the data of the received IP packet is transferred to the memory, and data is transferred from the memory to the SAR module, one cell by one cell. In this case, therefore, data is transferred through the I/O bus two time, similarly to the case of receiving the ATM cells. Accordingly, it is also a problem that the data transfer rate becomes low because of congestion of data on the I/O bus.

SUMMARY OF THE INVENTION

Accordingly, it is an object of the present invention to provide an ATM communication apparatus which has overcome the above mentioned problems of the prior art.

Another object of the present invention is to provide an ATM communication apparatus, capable of elevating the throughput from the receipt of the ATM cells to the output of the IP packet and from the receipt of the IP packet to the output of the ATM cells.

The above and other objects of the present invention are achieved in accordance with the present invention by a method for controlling an ATM communication apparatus including an SAR module for executing the processing of a low level layer in an ATM communication network, and a processing unit for executing the processing of a high level layer in the ATM communication network, for the purpose of realizing the function of converting an ATM cell which is a unit of information transmission in the ATM communication network, into an IP packet adapted to a communication protocol of a computer network, and the function of converting the IP packet to ATM cells, the method comprising, by action of the SAR module, the step of holding data of a received ATM cell and data indicating the relation between VCI/VPI of the received ATM cell and a destination of the received ATM cell, the step of transferring, when the received ATM cell is a heading cell of ATM cells constituting the IP packet, data of the heading cell to the processing unit, the step of reassembling the IP packet by using the held data of the received ATM cells, and determining the destination of the IP packet thus reassembled, on the basis of the data indicating the relation between the VCI/VPI of the received ATM cell and the destination of the received ATM cell, and by action of the processing unit, the step of causing the SAR module to hold the data indicating the relation between the VCI/VPI of the received ATM cell and the destination of the received ATM cell, from the data of the heading cell.

According to another aspect of the present invention, there is provided a method for controlling an ATM communication apparatus including an SAR module for executing the processing of a low level layer in an ATM communication network, and a processing unit for executing the processing of a high level layer in the ATM communication network, for the purpose of realizing the function of converting an ATM cell which is a unit of information transmission in the ATM communication network, into an IP packet adapted to a communication protocol of a computer network, and the function of converting the IP packet to ATM cells, the method comprising, by action of the SAR module, the step of holding data of a received IP packet, and data indicating the relation between an IP address indicating a destination of the received IP packet and VCI/VPI of ATM cells constituting the received IP packet, the step of generating an ATM cell by using the data of the received IP packet, and giving a header to the ATM cell thus generated, on the basis of the data indicating the relation between the IP address and the VCI/VPI, and by action of the processing unit, the step of causing the SAR module to previously hold the data indicating the relation between the IP address and the VCI/VPI, before sending the ATM cell to the ATM communication network.

According to still another aspect of the present invention, there is provided an ATM communication apparatus including an SAR module for executing the processing of a low level layer in an ATM communication network, and a processing unit for executing the processing of a high level layer in the ATM communication network, for the purpose of realizing the function of converting an ATM cell which is a unit of information transmission in the ATM communication network, into an IP packet adapted to a communication protocol of a computer network, and the function of converting the IP packet to ATM cells, wherein the SAR module includes a cell buffer for temporarily holding data of a received ATM cell, a lookup table for holding data indicating the relation between VCI/VPI of the received ATM cell and a destination of the received ATM cell, and a sending/receiving controller for transferring, when the received ATM cell is a heading cell of ATM cells constituting the IP packet, data of the heading cell to the processing unit, and reassembling the IP packet by using the data of the received ATM cells held in the cell buffer, and determining the destination of the IP packet thus reassembled, by referring to the lookup table, and wherein the processing unit causes the lookup table to hold the data indicating the relation between the VCI/VPI of the received ATM cell and the destination of the received ATM cell, from the data of the heading cell.

According to a further aspect of the present invention, there is provided an ATM communication apparatus including an SAR module for executing the processing of a low level layer in an ATM communication network, and a processing unit for executing the processing of a high level layer in the ATM communication network, for the purpose of realizing the function of converting an ATM cell which is a unit of information transmission in the ATM communication network, into an IP packet adapted to a communication protocol of a computer network, and the function of converting the IP packet to ATM cells, wherein the SAR module includes a cell buffer for temporarily holding data of a received IP packet, a VC table holding data indicating the relation between an IP address indicating a destination of the received IP packet and VCI/VPI of ATM cells constituting the received IP packet, and a sending/receiving controller for generating an ATM cell by using the data of the received IP packet held in the cell buffer, and giving a header to the ATM cell thus generated, by referring to the VC table, and wherein the processing unit causes the VC table to previously hold the data indicating the relation between the IP address and the VCI/VPI, before sending the ATM cell to the ATM communication network.

According to a still further aspect of the present invention, there is provided a recording medium storing a program to be executed by an ATM communication apparatus including an SAR module for executing the processing of a low level layer in an ATM communication network, and a processing unit for executing the processing of a high level layer in the ATM communication network, for the purpose of realizing the function of converting an ATM cell which is a unit of information transmission in the ATM communication network, into an IP packet adapted to a communication protocol of a computer network, and the function of converting the IP packet to ATM cells, wherein the program controls the SAR module to hold data of a received ATM cell and data indicating the relation between VCI/VPI of the received ATM cell and a destination of the received ATM cell, to transfer, when the received ATM cell is a heading cell of ATM cells constituting the IP packet, data of the heading cell to the processing unit, to reassemble the IP packet by using the held data of the received ATM cells, and to determine the destination of the IP packet thus reassembled, on the basis of the data indicating the relation between the VCI/VPI of the received ATM cell and the destination of the received ATM cell, and wherein the program controls the processing unit to cause the SAR module to hold the data indicating the relation between the VCI/VPI of the received ATM cell and the destination of the received ATM cell, from the data of the heading cell.

According to a further aspect of the present invention, there is provided a recording medium storing a program to be executed by an ATM communication apparatus including an SAR module for executing the processing of a low level layer in an ATM communication network, and a processing unit for executing the processing of a high level layer in the ATM communication network, for the purpose of realizing the function of converting an ATM cell which is a unit of information transmission in the ATM communication network, into an IP packet adapted to a communication protocol of a computer network, and the function of converting the IP packet to ATM cells, wherein the program controls the SAR module to hold data of a received IP packet, and data indicating the relation between an IP address indicating a destination of the received IP packet and VCI/VPI of ATM cells constituting the received IP packet, to generate an ATM cell by using the data of the received IP packet, and to give a header to the ATM cell thus generated, on the basis of the data indicating the relation between the IP address and the VCI/VPI, and wherein the program controls the processing unit to cause the SAR module to previously hold the data indicating the relation between the IP address and the VCI/VPI, before sending the ATM cell to the ATM communication network.

With the above mentioned arrangement, since the segmentation and the reassembly of the IP packet can be executed in the SAR module, it is possible to reduce congestion of data between the SAR module and the processing unit, so that the processing time for the segmentation and the reassembly of the IP packet can be reduced.

The above and other objects, features and advantages of the present invention will be apparent from the following description of preferred embodiments of the invention with reference to the accompanying drawings.

BRIEF DESCRIPTION OF THE DRAWINGS

FIG. 2 is a table illustrating one example of the construction of the lookup table provided in the sending/receiving controller shown in FIG. 1;

FIG. 9 is a flow chart illustrating the processing procedures of the router shown in FIG. 5 for converting the IP packet to the ATM cells.

DESCRIPTION OF THE PREFERRED EMBODIMENTS

Figure 1:
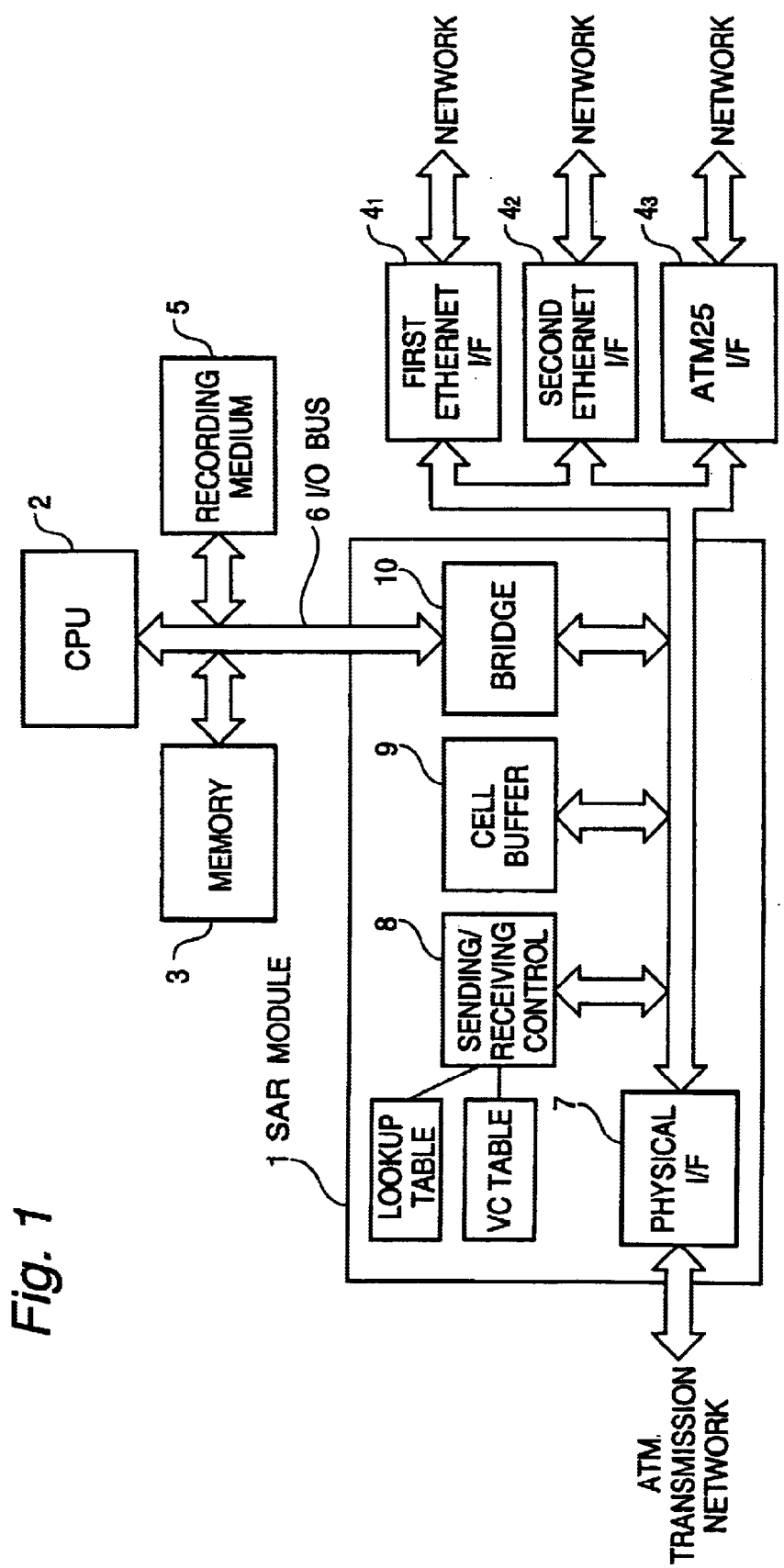
FIG. 1 is a block diagram showing the construction of the router which is one embodiment of the ATM communication apparatus in accordance with the present invention.

Now, the present invention will be described with reference to the drawing.

The ATM communication apparatus in accordance with the present invention is so constructed that the segmentation and the reassembly of the IP packet is executed in the SAR module. In the following, the ATM communication apparatus in accordance with the present invention will be described with reference to the router as an example, similarly to the explanation of the prior art example.

FIG. 1 is a block diagram showing the construction of the router which is one embodiment of the ATM communication apparatus in accordance with the present invention. FIG. 2 is a table illustrating one example of the construction of the lookup table provided in a sending/receiving controller shown in FIG. 1.

Referring to FIG. 1, the router in accordance with the present invention includes a SAR module 1 for executing the processing of a low level layer and segmentation and reassembly of the IP packet, a CPU 2 for executing the processing of a high level layer, a memory 3 for temporarily storing data used in the processing of the CPU 2, a first ethernet interface $4_1$ and a second ethernet interface $4_2$ which are an interface circuit for sending data to a network (ethernet) and receiving data from the network (ethernet), an ATM25 interface $4_3$ which is an interface circuit for sending data to a network of the ATM25 specification and receiving data from the network of the ATM25 specification, and a recording medium 5 storing a processing program executed in the CPU 2.

The SAR module 1, the CPU 2, the memory 3, the first ethernet interface $4_1$, the second ethernet interface $4_2$, the ATM25 interface $4_3$, the recording medium 5 are connected to an I/O bus 6 which is a data transfer medium. Incidentally, the first ethernet interface $4_1$, the second ethernet interface $4_2$, the ATM25 interface $4_3$ are provided dependently upon the network to which the router is connected, and therefore, it is not limited to this construction.

The SAR module 1 includes a physical interface 7 which is an interface circuit for sending data to the ATM communication network and receiving data from the ATM communication network, a sending/receiving controller 8 for executing the proceedings of the ATM layer and the ATM adaptation layer, and the segmentation and the reassembly of the IP packet, a cell buffer 9 for temporarily storing the received ATM cells and IP packet, and a bridge 10 which is an interface circuit for sending data to the CPU 2 and receiving data from the CPU 2.

The sending/receiving controller 8 includes a lookup table for recording the relation between VCI/VPI, the VC number and the destination (see FIG. 2) and a VC table recording the VC number, the address of a memory region for storing the data of the received ATM cell and IP packet, and VC associated data such as the number of received ATM cells and the packet length.

Incidentally, the sending/receiving controller 8 includes a controller independently of that in the CPU 2. The controllers provided in the CPU 2 and the sending/receiving controller 8, respectively, read the programs recorded in the recording medium 5, and execute, in accordance with the programs, the processing which will be described hereinafter. Incidentally, the recording medium 5 may be a magnetic disk, a semiconductor memory, a CD-ROM, or any other recording means.

Furthermore, as shown in FIG. 2, the destination recorded in the lookup table includes various devices included in the router (the CPU 2, the first ethernet interface $4_1$, the second ethernet interface $4_2$, the ATM25 interface $4_3$). The respective destinations are recorded in correspondence to the VC numbers.

Figure 3:
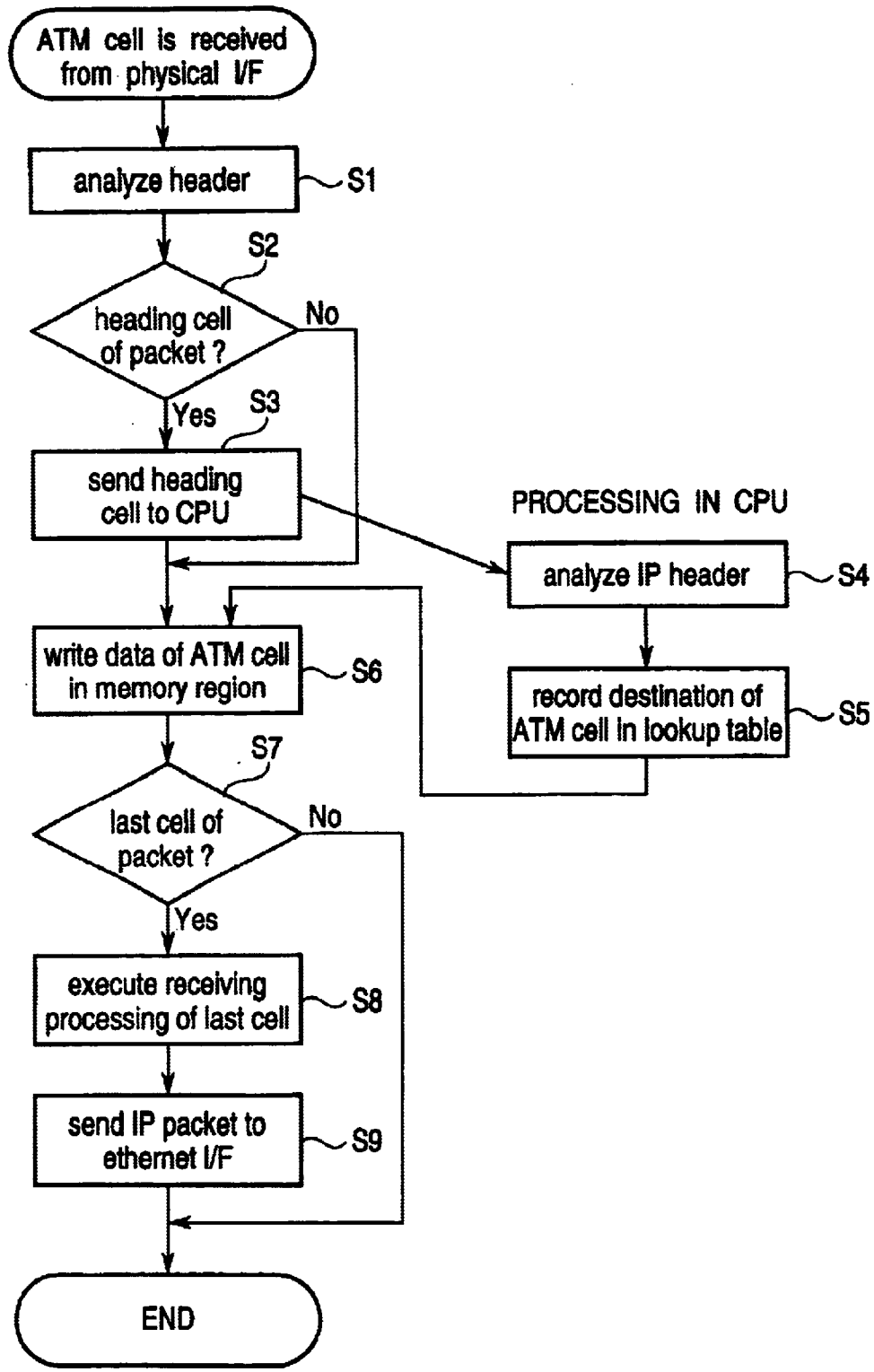
FIG. 3 is a flow chart illustrating the processing procedures of the router shown in FIG. 1 for converting the ATM cells to the IP packet.
Figure 4:
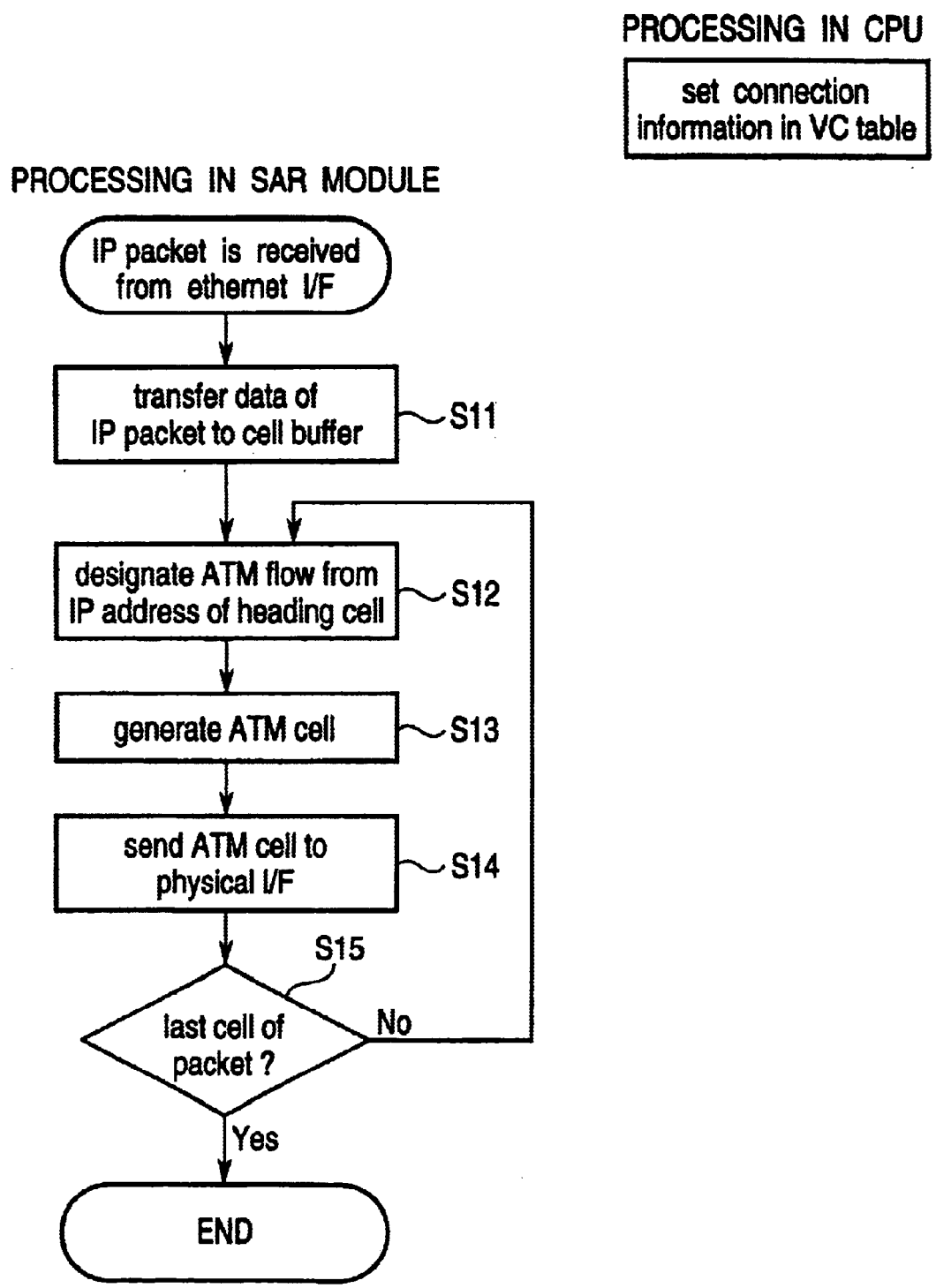
FIG. 4 is a flow chart illustrating the processing procedures of the router shown in FIG. 1 for converting the IP packet to the ATM cells.
Figure 5:
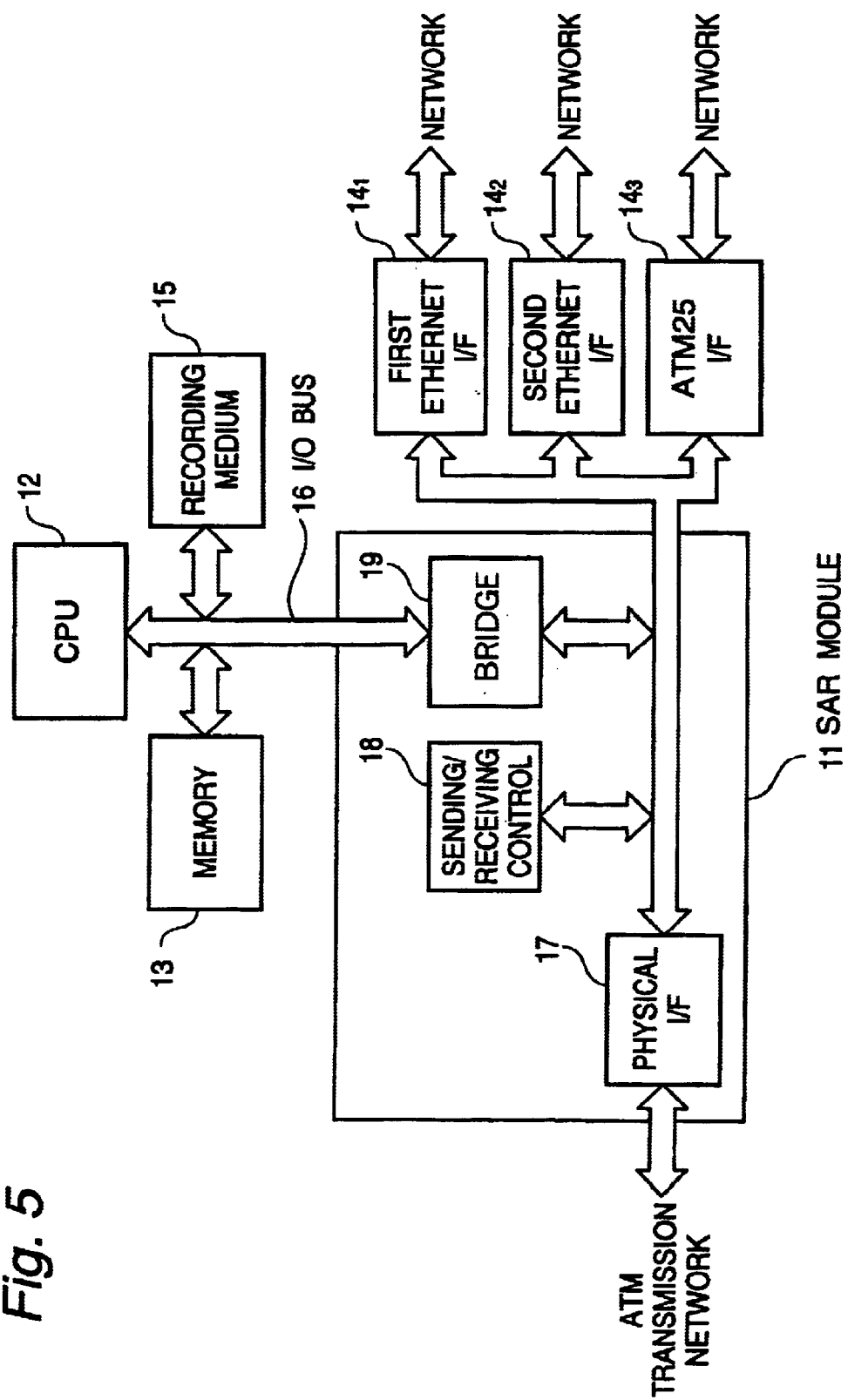
FIG. 5 is a block diagram showing the construction of the router which is one example of the prior art ATM communication apparatus.
Figures 6, 7:
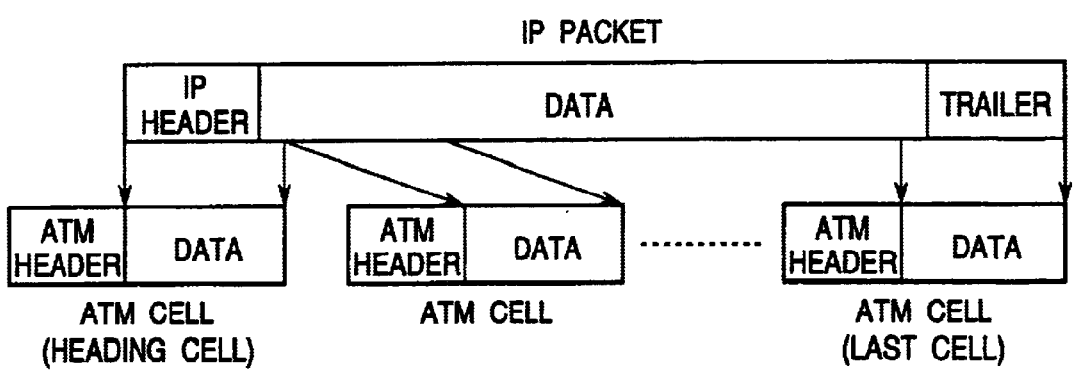
FIG. 6 is a table illustrating one example of the construction of the lookup table provided in a sending/receiving controller shown in FIG. 5.
FIG. 7 is a diagram illustrating the relation between the IP packet and the ATM cells.
Figure 8:
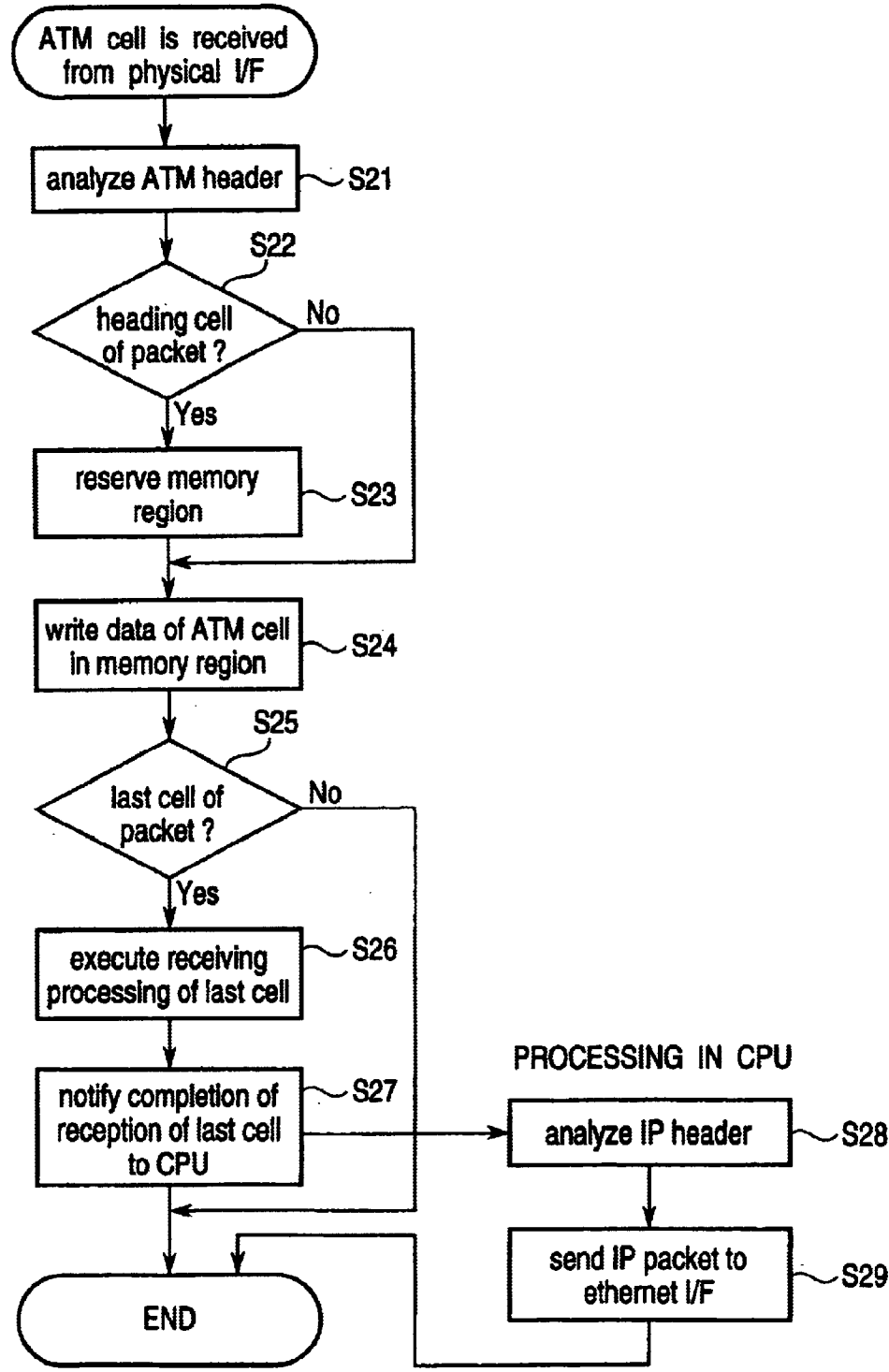
FIG. 8 is a flow chart illustrating the processing procedures of the router shown in FIG. 5 for converting the ATM cells to the IP packet.

Now, an operation of the ATM communication apparatus in accordance with the present invention will be described with reference to FIG. 3 and FIG. 4. FIG. 3 is a flow chart illustrating the processing procedures of the router shown in FIG. 1 for converting the ATM cells to the IP packet. FIG. 4 is a flow chart illustrating the processing procedures of the router shown in FIG. 1 for converting the IP packet to the ATM cells.

In the processing procedures shown in FIG. 3 for converting the ATM cells to the IP packet, if the sending/ receiving controller 8 in the SAR module 1 receives the ATM cell through the physical interface 7, the sending/receiving controller 8 analyzes the content of the header of the received ATM cell (step S1), and discriminates whether or not the received ATM is the heading cell of a plurality of ATM cells which constitute one IP packet (step S2).

If the received ATM is the heading cell of the IP packet, the sending/receiving controller 8 transfers the received ATM cell to the CPU 2 (step S3). If the received ATM is not the heading cell of the IP packet, the processing of the step S3 is not executed, and the processing goes into a next processing (step S6).

If the CPU 2 receives the received ATM cell, the CPU 2 analyzes the content of the IP header included in the heading cell (step S4), and records the destination of the received ATM cell (namely, the destination of the IP packet) in the lookup table (step S5).

After the processing of the step S5 in the CPU 2 is completed, the sending/receiving controller 8 reserves a predetermined amount of memory region in the cell buffer. Furthermore, the sending/receiving controller 8 refers to the lookup table, and obtain the VC number corresponding to VCI/VPI of the received ATM cell, and further, refers to the VC table on the basis of the obtained VC number, and writes the data of the received ATM into the reserved memory region. When the received ATM is the heading cell of the IP packet, the data is written from the heading address of the reserved memory region. The address of the memory region is recorded in the VC table as the data corresponding to the VC number. After the data of the ATM cell has been written, the address of this memory region is updated to a succeeding address. On the other hand, when the received ATM is not the heading cell of the IP packet, the data of the received ATM is written from the memory region address obtained by referring to the VC table (the updated address).

Next, the sending/receiving controller 8 analyzes the ATM header of the received ATM cell, again, and discriminates whether or not the received ATM is the last cell of the IP packet (step 7). When the received ATM cell is not the last cell of the IP packet, the processing is ended without executing succeeding steps S8 and S9.

When the received ATM is the last cell of the IP packet, the sending/receiving controller 8 executes the reassembly of the IP packet by using the data of the ATM cells stored in the cell buffer 9, and the receiving processing of the last cell such as the freeing of the memory region which has been used (step S8). Furthermore, the sending/receiving controller 8 refers to the lookup table to ascertain the destination of the IP packet, and sends the IP packet through the internet interface corresponding to the destination, of the first internet interface $4_1$ and the second internet interface $4_2$ (step S9).

In the step 6, if the result of the reference to the lookup table indicates that the destination of the received ATM cell is "ATM25", the sending/receiving controller 8 transfers the ATM cell to the ATM25 interface $4_3$ as it is, without reserving the memory region in the cell buffer 9.

Next, the procedures for converting the received IP packet to the ATM cells will be described with reference to FIG. 4.

Here, it is necessary to set the connection for the ATM communication network, before sending the ATM cell. At this connection setting time, the CPU 2 previously records, in the VC table, the IP address indicating the destination of the IP packet, the VC number, the connection information indicating the VCI/VPI relation to be given to the ATM cell.

In the procedures illustrated in FIG. 4, if the sending/receiving controller 8 in the SAR module 1 receives the IP packet through the first internet interface $4_1$ or the second internet interface $4_2$, the sending/receiving controller 8 first reserves a predetermined amount of memory region in the cell buffer 9, and transfers the data of the received IP packet to the reserved memory region (step S11).

Then, the sending/receiving controller 8 refers to the VC table, and identifies the flow (transmission path) of each ATM cell included in the received IP packet, on the basis of the IP address included in the IP header of the received IP packet, the VC number, and the VCI/VPI relation to be given to the ATM cell (step S12).

Succeedingly, the sending/receiving controller 8 reads out data of the amount corresponding to one cell, from the memory region of the cell buffer 9 storing the data of the IP packet, and generates one ATM cell by using the read-out data (step S13). At this time, the VCI/VPI value obtained by referring to the VC table is written into an ATM header.

Thereafter, the sending/receiving controller 8 sends the generated ATM cell through the physical interface 7 to the ATM communication network (step S14), and discriminates whether or not the sent ATM cell is the last cell of the IP packet (step S15). If the sent ATM cell is not the last cell of the IP packet, the processing returns to the step S12, so that the processing of the steps S12–S14 is repeated. If the sent ATM cell is the last cell of the IP packet, the processing is ended.

Incidentally, when the ATM cell is received through the ATM25 interface $4_3$ from the computer network, the received ATM cell is transferred through the physical interface 7 to the ATM communication network as it is.

Thus, since the ATM communication apparatus in accordance with the present invention is so constructed that the segmentation and the reassembly of the IP packet is executed in the SAR module 1, it is possible to reduce congestion of data between the SAR module 1 and the CPU 2, so that the processing time for the segmentation and the reassembly of the IP packet can be reduced.

In addition, when a plurality of IP packets having the same destination are received, if only the heading cell of the first received IP packet is transferred to the CPU so that the destination is set in the lookup table, data can be transferred to the ethernet interface in the second and succeeding received IP packets without intermediary of the CPU 2, with the result that the throughput can be further elevated.

In the above description, the router has been described as an example of the ATM communication apparatus in accordance with the present invention, however, the present invention can be applied to any apparatus if it has the function of converting ATM cells into an IP packet and of converting the IP packet into the ATM cells.

As mentioned above, since the segmentation and the reassembly of the IP packet is executed in the SAR module, congestion of data between the SAR module and the processing unit can be reduced, and therefore, the ATM communication apparatus in accordance with the present invention can reduce the processing time for the segmentation and the reassembly of the IP packet. Therefore, the throughput from the input of the ATM cells to the output of the IP packet and from the input of the IP packet to the output of the ATM cells can be elevated.

The invention has thus been shown and described with reference to the specific embodiments. However, it should be noted that the present invention is in no way limited to the details of the illustrated structures but changes and modifications may be made within the scope of the appended claims.

What is claimed is:

1. A method for controlling an ATM communication apparatus including an SAR module for executing the processing of a low level layer in an ATM communication network, and a high level processing unit distinct from said SAR module for executing the processing of a high level layer in said ATM communication network, for realizing the function of converting an ATM cell which is a unit of information transmission in said ATM communication network, into an IP packet adapted to a communication protocol of a computer network, and the function of converting the IP packet to ATM cells, the method comprising:

by action only of said SAR module, holding data of a received ATM cell and data indicating the relation between VCI/VPI of said received ATM cell and a destination of said received ATM cell, transferring, when said received ATM cell comprises a heading cell of ATM cells forming said IP packet, data of said heading cell to said processing unit, reassembling said IP packet by using the held data of said received ATM cells, determining the destination of said IP Packet thus reassembled, on the basis of said data indicating the relation between said VCI/VPI of said received ATM cell and said destination of said received ATM cell, and by action only of said high level processing unit, causing said SAR module to hold said data indicating the relation between said VCI/VPI of said received ATM cell and said destination of said received ATM cell, from the data of said heading cell.

2. The method of claim 1, wherein the SAR module comprises a sending/receiving controller.

3. The method of claim 1, wherein the SAR module comprises a cell buffer.

4. The method of claim 1, wherein the SAR module comprises a bridge.

5. A method for controlling and ATM communication apparatus including an SAR module for executing the processing of a low level layer in an ATM communication network, and a high level processing unit distinct from said SAR module for executing the processing of a high level layer in said ATM communication network, for realizing the function of converting an ATM cell which is a unit of information transmission in said ATM communication network, into an IP packet adapted to a communication protocol of a computer network, and the function of converting the IP packet to ATM cells, the method comprising:

by action only of said SAR module, holding data of a received IP packet, and data indicating the relation between an IP address indicating a destination of said received IP packet generating an ATM cell by using the data of said received IP packet, giving a header to the ATM cell thus generated, on the basis of said data indicating the relation between said IP address and said VCI/VPI, and by action only of said high level processing unit, causing said SAR module to previously hold said data indicating the relation between said IP address and said VCI/VPI, before sending said ATM cell to said ATM communication network.

6. The method of claim 5, wherein the SAR module comprises a sending/receiving controller.

7. The method of claim 5, wherein the SAR module comprises a cell buffer.

8. The method of claim 5, wherein the SAR module comprises a bridge.

9. An ATM communication apparatus comprising:

an SAR module for executing the processing of a low level layer in an ATM communication network, and a high level processing unit distinct from said SAR module for executing the processing of a high level layer in said ATM communication network, for realizing the function of converting an ATM cell which comprises a unit of information transmission in said ATM communication network, into an IP packet adapted to a communication protocol of a computer network, and the function of converting the IP packet to ATM cells, wherein said SAR module includes:
a cell buffer for temporarily holding data of a received ATM cell,
a lookup table for holding data indicating the relation between VCI/VPI of said received ATM cells and a destination of said received ATM cell, and
a sending/receiving controller for transferring, when said received ATM cell comprises a heading cell of ATM cells forming said IP packet, data of said heading cell to said processing unit, and reassembling said IP packet by using the data of said received ATM cells held in said cell buffer, and determining the destination of said IP packet thus reassembled, by referring to said lookup table, and wherein said high level processing unit causes said lookup table to hold said data indicating the relation between said VCI/VPI of said received ATM cell and said destination of said received ATM cell, from the data of said heading cell.

10. The apparatus of claim 9, wherein the SAR module further comprises a bridge.

11. An ATM communication apparatus comprising:

an SAR module for executing the processing of a low level layer in an ATM communication network, and a high level processing unit distinct from said SAR module for executing the processing of a high level layer in said ATM communication network, for realizing the function of converting an ATM cell which is a unit of information transmission in said ATM communication network, into an IP packet adapted to a communication protocol of a computer network, and the function of converting the IP packet to ATM cells, wherein said SAR module includes:
a cell buffer for temporarily holding data of a received IP packet,
a VC table holding data indicating the relation between an IP address indicating a destination of said received IP packet and VCI/VPI of ATM cells forming said received IP packet, and
a sending/receiving controller for generating an ATM cell by using the data of said received IP packet held in said cell buffer, and giving a header to the ATM cell thus generating, by referring to said VC table, and wherein said high level processing unit causes said VC table to previously hold said data indicating the relation between said IP address and said VCI/VPI, before sending said ATM cell to said ATM communication network.

12. The apparatus of claim 11, wherein the SAR module further comprises a bridge.

13. A recording medium storing a program to be executed by an ATM communication apparatus including an SAR module executing the processing of a low level layer in an ATM communication network, and a high level processing unit distinct from said SAR module for executing the processing of a high level layer in said ATM communication network, for realizing the function of converting an ATM cell which is a unit of information transmission in said ATM communication network, into an IP packet adapted to a communication protocol of a computer network, and the function of converting the IP packet to ATM cells, wherein said program controls only said SAR module to hold data of a received ATM cell and data indicating the relation between VCI/VPI of said received ATM cell and a destination of said received ATM cell, to transfer, when said received ATM cell comprises a heading cell of ATM cells forming said IP packet, data of said heading cell to said processing unit, to reassemble said IP packet by using the held data of said received ATM cells, and to determine the destination of said IP packet thus reassembled, on the basis of said data indicating the relation between said VCI/VPI of said received ATM cell and said destination of said received ATM cell, and wherein said program controls only said high level processing unit to cause said SAR module to hold said data indicating the relation between said VCI/VPI of said received ATM cell and said destination of said received ATM cell, from the data of said heading cell.

14. The medium of claim 13, wherein the SAR module comprises a sending/receiving controller.

15. The medium of claim 13, wherein the SAR module comprises a cell buffer.

16. The medium of claim 13, wherein the SAR module comprises a bridge.

17. A recording medium storing a program to be executed by an ATM communication apparatus including an SAR module for executing the processing of a low level layer in an ATM communication network, and a high level processing unit distinct from said SAR module for executing the processing of a high level layer in said ATM communication network, for realizing the function of converting an ATM cell which comprises a unit of information transmission in said ATM communication network, into an IP packet adapted to a communication protocol of a computer network, and the function of converting the IP packet to ATM cells, wherein said program controls only said SAR module to hold data of a received IP packet, and data indicating the relation between an IP address indicating a destination of said received IP packet and VCI/VPI of ATM cells forming said received IP packet, to generate an ATM cell by using the data of said received IP packet, and to give a header to the ATM cell thus generated, on the basis of said data indicating the relation between said IP address and said VCI/VPI, and wherein said program controls only said high level processing unit to cause said SAR module to previously hold said data indicating the relation between said IP address and said VCI/VPI, before sending said ATM cell to said ATM communication network.

18. The medium of claim 17, wherein the SAR module comprises a sending/receiving controller.

19. The medium of claim 17, wherein the SAR module comprises a cell buffer.

20. The medium of claim 17, wherein the SAR module comprises a bridge.

\* \* \* \* \*